United States Patent [19]

Rossmo

[11] Patent Number: 5,781,704
[45] Date of Patent: Jul. 14, 1998

[54] EXPERT SYSTEM METHOD OF PERFORMING CRIME SITE ANALYSIS

[75] Inventor: Darcy Kim Rossmo, Vancouver, Canada

[73] Assignee: Environmental Criminology Research, Inc., Canada

[21] Appl. No.: 730,465

[22] Filed: Oct. 11, 1996

[51] Int. Cl.$^6$ .................................................. G06F 17/00
[52] U.S. Cl. .................. 395/75; 395/10; 705/1
[58] Field of Search .................. 395/10, 75; 705/1, 705/7

[56] References Cited

PUBLICATIONS

Betts, "Computer maps help cops catch crooks," Computerworld, p. 32, Feb. 15, 1993.
Maurer, "Geographical coding helps to map out strategies," Crain's detroit business, Jan. 17, 1994, p. 13.
Duncan, "Putting Crime on the map," Computer Talk, Nov. 18, 1991, p. 8.
Miller, "Computers trak the criminal's trail," American Demographics, p. 13, Jan. 1994.

Primary Examiner—Allen R. MacDonald
Assistant Examiner—Jeffrey S. Smith
Attorney, Agent, or Firm—Hayes, Soloway, Hennessey, Grossman & Hage, P.C.

[57] ABSTRACT

An expert system method is provided that performs crime site analysis in a criminal activity area to determine a likely center of criminal activity. The method uses distances from related crime sites to determine a probability surface for the entire criminal activity area. A target area having highest values of probability becomes the center of criminal activity. The expert system can be used to access other crime databases such as witness reports to further define the criminals' residence or workplace.

10 Claims, 6 Drawing Sheets

EXPERT SYSTEM METHOD OF PERFORMING CRIME SITE ANALYSIS

FIELD OF THE INVENTION

The present invention relates to expert system methods of performing crime site analysis and is particularly concerned with determining bases of criminal activity.

BACKGROUND OF THE INVENTION

A focus of any police investigation is the crime scene and its evidentiary contents. What is often overlooked, however, is a geographic perspective on the actions preceding the offense: the spatial behaviour that led to the crime scene. For any violent crime to occur there must have been an intersection in both time and place between the victim and offender. How did this happen? What were the antecedents? What do the spatial elements of the crime tell us about the offender and his or her actions? What are the hunting patterns of predatory offenders? These questions are particularly relevant in cases of serial murder, rape and arson.

Environmental criminology and routine activity theory provide a general framework for addressing these questions. In addition, the model of crime-site selection developed by Brantingham and Brantingham (1981) suggests a specific approach for determining the most probable location of offender residence in cases of serial violent crimes. Research in this area represents a practical application of criminological theory to the real world of police investigation, which not only can contribute useful information to law enforcement agencies buy may also open up possibilities for new and innovative investigative methodologies.

The nature of serial violent crime creates unique problems for law enforcement, requiring special police responses and investigative strategies. Klockars (1983) asserts that there are only three ways to solve a crime: (1) a confession, (2) a witness and (3) physical evidence. Traditionally, the search for witnesses, suspects and evidence has followed a path, originating from the victim and the crime scene outward. Most homicides, for example, are cleared for the simple reason that they involve people who know each other, and the process of offender identification is often only one of suspect elimination.

Such obvious connections rarely exist in cases of stranger crimes. The lack of any relationship between the victims and the offender makes these crimes difficult to solve. In conducting these types of investigations working outward from the victim is a difficult task. The alternative, then, is to work inward, trying to establish some type of link between potential suspects and the victim or crime scene. This process requires the delineation of a likely group of potential suspects; such efforts, however, can produce lists often numbering into the thousands, causing problems with information overload. In the still unsolved Seattle-area Green River Killer case, for example, 18,000 suspect names have been collected. But as of February 1992, the police have only had the time and resources to investigate some 12,000 of these (Montgomery, 1992). The Yorkshire Ripper case had, by the time it was solved, 268,000 names in the nominal index (Doney, 1990).

Traditionally, the main interest of criminology has been the offender and much effort has gone into studying offender backgrounds, peer influences, criminal careers and deterrence. This focus has tended to ignore the other components of crime—the victim, the criminal law and the crime. The crime setting or place, the "where and when" of the criminal act, makes up what Brantingham and Brantingham (1981) call the fourth dimension of crime—the primary concern of environmental criminology "Environmental criminologists set out to use the geographic imagination in concert with the sociological imagination to describe, understand, and control criminal events" (Brantingham and Brantingham, 1981:21). The roots of this perspective lie in human ecology, Jeffery's bio-social learning approach and Hirschi's social control theory (Brantingham and Brantingham, 1981; Vold and Bernard, 1986).

Research in this area has taken a broad approach by including in its analyses operational, perceptual, behavioral, physical, social, psychological, legal, cultural, and geographic settings. These works range micro to meso to macrospatial levels of analytic focus. One of environmental criminology's major interests, the study of the dimensions of crime at the microspatial level, has often led to useful findings in the area of crime prevention (see, for example, Clarke, 1992). Other projects have included the analyses of: crime trips (Rhodes and Conly, 1981); efforts to understand target and victim selections through opportunities for crime (Brantingham and Brantingham, 1981); crime prevention initiatives, notably crime prevention through environmental design (Jeffery, 1977, Wood, 1981); proposals for rapid transit security (Felson, 1989); patterns of fugitive migration (Rossmo, 1987); and other methods (see Clarke; 1992).

While police officers are intuitively aware of the influence of place on crime, they sometimes are unaware of the different ways in which geography can assist their work. In spite of this general lack of understanding, however, there are some specific examples of the use of geographic principles by the police in efforts to investigate crimes and apprehend suspects.

Some police dog handlers, for instance, have noted patterns in the escape routes and movements of offenders fleeing from the scenes of their crimes (Eden, 1985). This predictability in the movements of those under stress has been observed in both actual trackings of suspects and experimental reenactments using police dog quarries. Fleeing criminals tend to turn to the left if they are right-handed, move to the right upon encountering obstacles, discard evidentiary items to their right and stay near the outside walls when hiding in large buildings (Eden, 1985). Different patterns are found when conducting passive tracks for missing persons. Lost subjects tend to bear to the right in their wanderings, and men seem to favor downhill paths while women and children choose uphill routes (Eden, 1985).

Senior Superintendent Arvind Verma describes how the Indian Police Service in the Bihar province have used a form of geographical analysis in the investigation of certain types of crimes. Dacoities are robberies with violence involving gangs of five or more offenders. This type of criminal act dates back to 500 BC and usually occurs in the countryside. The lack of anonymity in a rural setting requires the dacoity gang to attack villages other than their own, and then only during those nights when the moon is new. There is usually little or no artificial lighting in rural India, and the lunar dark phase is a period of almost complete blackness that provides cover for such criminal activities.

Upon being notified of a dacoity, the police will first determine the length of time between the occurrence of the crime and first light. Knowing the average speed that a person can travel cross-country on foot then allows the police to calculate a distance radius, centered on the crime site, which determines a circle within which the home village of the dacoity members most probably lies. There are few vehicles and if the criminals are not home by daylight, they run the risk of being observed by farmers who begin to work the fields at dawn.

The villages located within this circle can then be narrowed down by eliminating those of the same caste as the victim village, as "brother" is not likely to harm "brother". And, if a sufficiently detailed description of the criminals can be obtained, dress, modus operandi and other details can help determine the caste of the gang, allowing the police to concentrate further on the appropriate villages. Patrols can then speed to these places and attempt to intercept the dacoity members, or to proceed to investigate known criminal offenders residing in the area.

In an effort to focus the Hillside Strangler investigation, the Los Angeles, CA Police Department (LAPD) attempted to determine the most likely location of the scene of the homicides. The police knew where the victims had been apprehended and where their bodies had been dumped, and the distances between these two points (Gates and Shah, 1992). The LAPD computer analysts viewed the problem in terms or Venn diagrams, with the center of each circle representing victim availability, the circumference representing offender capacity and the radius representing offender ability (Holt, 1993).

Vectors drawn from the point where the victims were abduced to the location where their bodies were found were added together to produce a common radius, which defined a circle encompassing an area of just over three square miles. The LAPD saturated this zone with 200 police officers in an attempt to find the murderers. While they were not successful, it is possible that the heavy police presence inhibited the killers, and prompted murderer Kenneth Bianchi's move from Los Angeles to Bellingham, Wash. The center of this zone, the LAPD later found out, was not far from co-murderer Angelo Buono's automobile upholstery shop-cum-residence (Gates and Shah, 1992).

Geographic techniques were also used in the Yorkshire Ripper investigation. With the murders still unsolved after five and one-half years, Her Majesty's Inspector of Constabulary Lawrence Byford implemented a case review process (Kind, 1987a). Detectives had become divided over the issue of the killer's residence. One school of thought, led by the chief investigating officer, believed that the Ripper was from the Sunderland area, while other investigators thought he was a local man. After an intensive investigative review, the Byrord advisory team came to the latter conclusion.

To help test this deduction, they applied two "navigational metrical tests" to the spatial and temporal data associated with the crimes (Kind, 1987a:388–390). The first test involved the calculation of the center of gravity (spatial mean) for the 17 crimes (13 murders and four assaults) believed to be linked to the Yorkshire Ripper. The second test consisted of plotting time of offense against length of day (approximated by month of year). The rationale behind this approach had its basis in the theory that the killer would not be willing to attack late at night if his return journey to home was too far.

The first navigational test resulted in the finding that the center of gravity for the Ripper attacks lay near Bradford. The second test determined that the later attacks were those located in the West Yorkshire cities of Leeds and Bradford. Both tests therefore supported the team's original hypothesis that the killer was a local man. Peter William Sutcliffe who resided in the district of Heaton in the city of Bradford, was arrested three weeks later by a patrol constable and sergeant in Sheffield.

Newton and Newton (1985) applied what they termed geoforensic analysis to a series or unsolved female homicides that occurred in Fort Worth, Tex. from 1983 to 1985. They found that localized serial murder or rape tends to form place-time patterns different from those seen in "normal" criminal violence. The unsolved Fort Worth murders were analyzed by employing both quantitative (areal associations, crime site connections, centrographic analysis) and qualitative (landscape analysis) techniques.

Newton and Swoope (1987) also utilized geoforensic techniques in a retrospective analysis of the Hillside Strangler case. Different geographic centers were calculated from the coordinates of the locations of various types of crime sites. They discriminated between points of fatal encounter, body or car dump sites and victim's residences and found that the geographic center of the body dump sites most accurately predicted the location of the residence of murderer Angelo Buono's. A search radius (circumscribing an area around the geographic center in which the killers were thought to most likely be found) was also calculated, the range of which decreased with the addition of the spatial information provided by each new murder.

The locations where crimes happen are not completely random, but instead often have a degree of underlying spatial structure. As chaotic as they may sometimes appear to be, there is often a rationality influencing the geography of their occurrence. Routine activity theory suggests that crimes tend to occur in those locations where suitable (in terms of profit and risk) victims are encountered by motivated offenders as both move through their daily activities (Clarke and Felson, 1993; Cornish and Clarke, 1986; Felson, 1986, 1987). As offenders travel among their homes, workplaces, and social activity sites, their activity space (composed of these locations and their connecting paths) describes an awareness space that forms part of a larger mental map—an "image of the city" built upon experience and knowledge.

Within a person's activity space is usually an anchor point or base, the single most important place in their spatial life. For the vast majority of people this is their residence. For others, however, the anchor point may be elsewhere, such as the work site or a close friend's home. It should be remembered that some street criminals do not have a permanent residence and may base their activities out of a bar, pool hall or some other such social activity location (Rengert, 1990). They might also be homeless, living on the street, or may be transient or mobile to such a degree that they lack any real form of anchor point.

Brantingham and Brantingham (1981) suggests that the process of criminal target selection is a dynamic one. Crimes occur in those locations where suitable targets are overlapped by the offender's awareness space. Offenders may then move outward in their search for additional targets, their interactions decreasing with distance. Search pattern probabilities can thus be modeled by a distance-decay function that show an inverse relationship between the level of interactions and the distance from the locations and routes that comprise the activity space. There may also be a "buffer zone" centered around the criminal's home, within which the offender sees targets as being too risky to victimize because of their proximity to his or her residence (of Newton and Swoope, 1987).

The Brantingham and Brantingham (1981) model predicts, for the simplest case, that the residence of the offender would lie at the center of crime pattern and therefore could be approximated by the spatial mean. The intricacy of most activity spaces, however, suggests that more complex patterns may be appropriate. Rengert (1991) proposes four hypothetical spatial patterns that could be used to describe the geography of crime sites; (1) a uniform pattern with no distance-decay influence; (2) a bull's-eye pattern with spatial clustering, exhibiting distance-decay centered around the offender's primary anchor point; (3) a bimodal pattern with crime clusters centered around two anchor points; and (4) a teardrop pattern with a directional bias oriented toward a secondary anchor point.

Situations can also be distorted by a variety of other real world factors—movement often follows street grids, traffic flows can distort mobility patterns, variations exist in zoning and land use, and crime locations may cluster depending upon the nature of the target backdrop (i.e., the spatial distribution of targets or victims). The spatial mean is therefore limited in its ability to pinpoint criminal residence.

SUMMARY OF THE INVENTION

An object of the present invention is to provide an improved expert system method of performing crime site analysis to determine centers of criminal activity.

The spatial relationship between the offender's home and his or her crimes is an underlying theme in much of the prior art. The present invention asked the question "Is it possible to "invert" this research and use the locations of a series of crimes to suggest where an offender might reside?" By reversing the reasoning and logic of these theoretical models, it may be feasible to predict the most probable location of a criminal's residence. The present invention allows the principles of environmental criminology and the geography of crime to be practically applied to the police investigative process.

In accordance with one aspect of the present invention there is provided an expert system method of n expert system method of performing crime site analysis for determining a base of criminal activity, comprising the steps of: locating a plurality of related crime sites on an area map; delineating a criminal activity area on the area map in dependent upon spacing between the plurality of crime sites; establishing an x-y grid having a plurality of grid points within the criminal activity area; for each grid point, determining a distance to each of the plurality of related crime sites; for each grid point, generating a first probability value in dependence upon each distance, then combining first probability values to provide a second probability value; and outputting a center of criminal activity in dependence upon second probability values for the criminal activity area.

Clues derived from crime location and place can be of significant assistance to law enforcement in the investigation of repetitive offenses. The probable spatial behavior of the offender can be derived from information contained in the known crime site locations (e.g., encounter/apprehension sites, murder scenes, body/property dump sites), their geographic connections, and the characteristics and demography of the surrounding neighborhoods in accordance with embodiments of the present invention determining the probability of the offender residing in various areas, and displaying those results through the use of choropleth or isopleth maps, can assist police efforts to apprehend criminals. This information allows police departments to focus their investigative activities, geographically prioritize suspects and concentrate saturation or directed patrolling efforts in those zones where the criminal predator is most likely to be active.

However, combining centrographic principles and journey to crime research in a manner informed by environmental criminological theory can produce a viable method for predicting the location of offender residence from crime site coordinates. By examining the spatial data connected to a series of crime sites, the present invention may generate a three-dimensional surface, the "height" of which represents the relative probability that a given point is the residence or workplace of the offender.

The present invention targeting is based on the Brantingham and Brantingham (1981) model for crime site selection and on the routine activities approach (Felson, 1986). The present invention uses a distance-decay function f(d) that simulates journey to crime behaviour. A probability value $f(d_c)$ is assigned to each point (x, y), located at distance d from crime sites. The final probability value for a point (x, y), representing the likelihood that the offender lives at that location, is determined by combining the n values derived at that point from the n different crime sites.

The tests of the present invention in actual police investigations and on solved cases of serial murder, rape and arson has shown promising results, usually locating the offender's residence in the top 5% or less of the total hunting area.

BRIEF DESCRIPTION OF THE DRAWINGS

The present invention will be further understood from the following detailed description with reference to the drawings in which.

DETAILED DESCRIPTION

Figure 1:
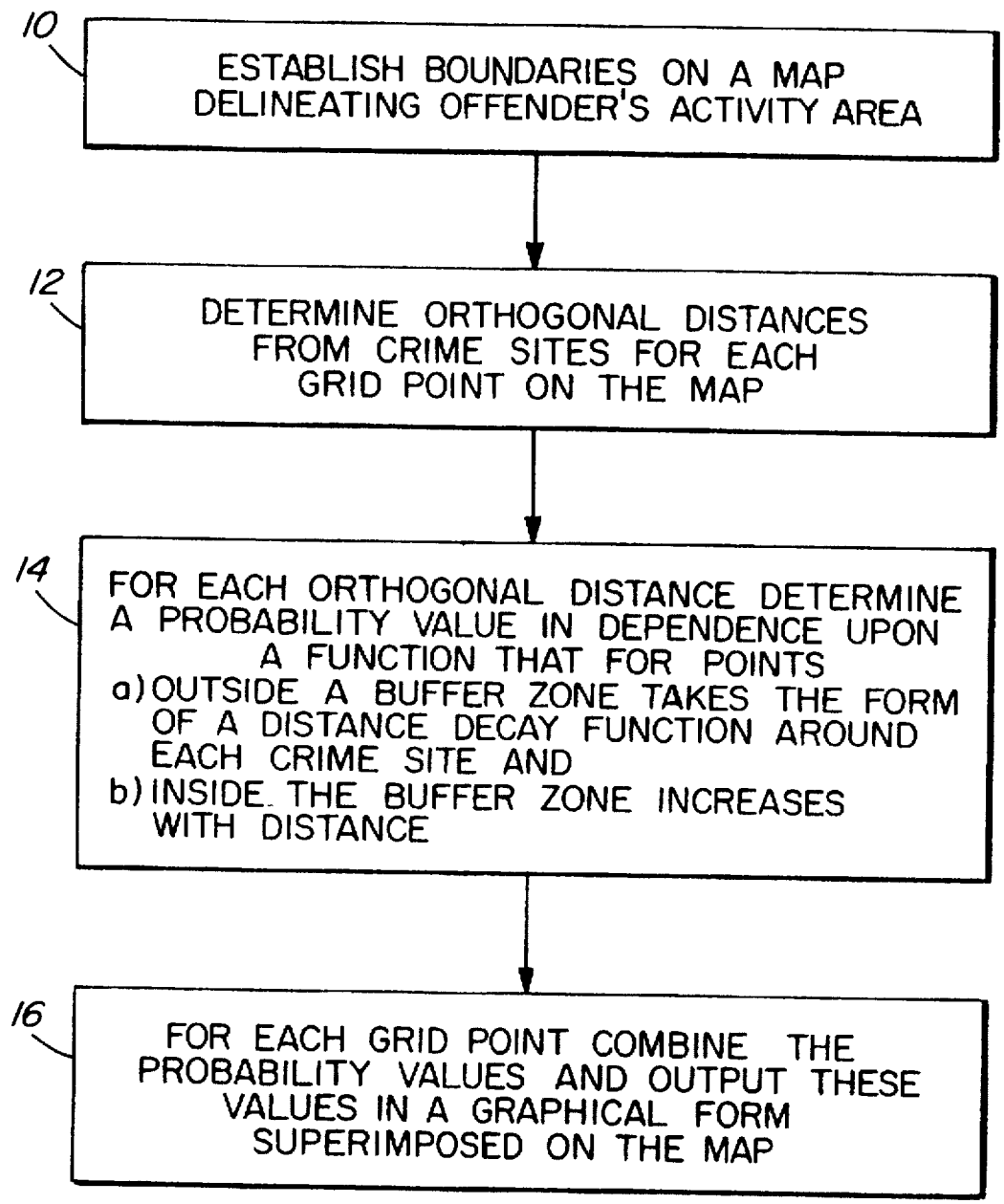
FIG. 1 illustrates in a flow chart a process in accordance with an embodiment of the present invention.

The present invention analyses the spatial information associated with a series of linked crimes, attempts to determine the most probable areas in which the offenders residence might be located. It employs the information and insights provided by journey to crime research and addresses some of the problems associated with centrography.

The model is based on a four-step process:

(1) Map boundaries delineating the offender's activity area are first established using the locations of the crimes and procedures for addressing edge effects, as represented by a block 10.

(2) Manhattan distances (i.e., orthogonal distances measured along the street grid) from every "point" on the map, the number of which is determined by the measurement resolution or the x and y scales, to each crime location are then calculated, as represented by a block 12.

(3) Next, these Manhattan distances are used as independent variable values in a function that produces a number that: (a) if the point lies outside the buffer zone, becomes smaller the longer the distance, following some form of distance-decay; or (b) if the point lies inside the buffer zone, becomes larger the longer the distance, as represented by a block 14. Numbers are computed from this function for each of the crime locations. For example, if there are 12 crime locations, each point on the map will have 12 numbers associated with it.

(4) Finally, these multiple numbers are combined together to produce a single score for each map point, as represented by a block 16. The higher the resultant score, the greater the probability that the point contains the offender's residence.

Figure 2:
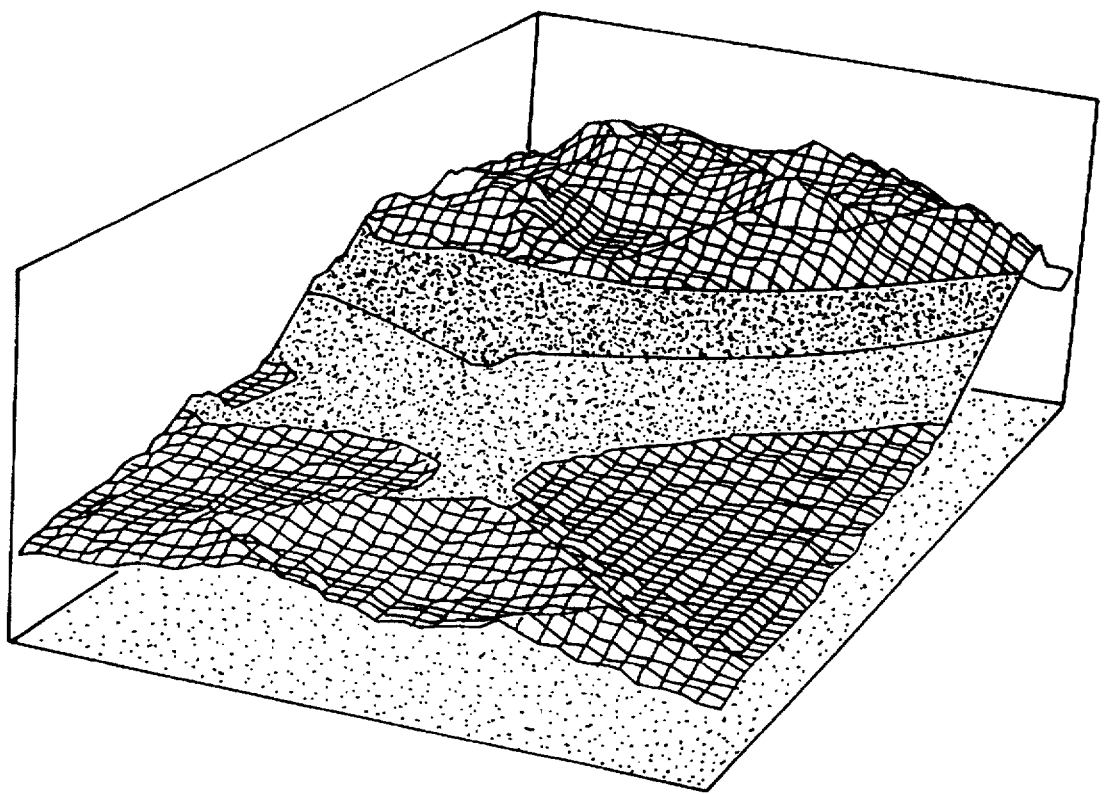
FIG. 2 graphically illustrates an isopleth map generated by the process of FIG. 1 for a solved crime in San Diego.
Figure 3:
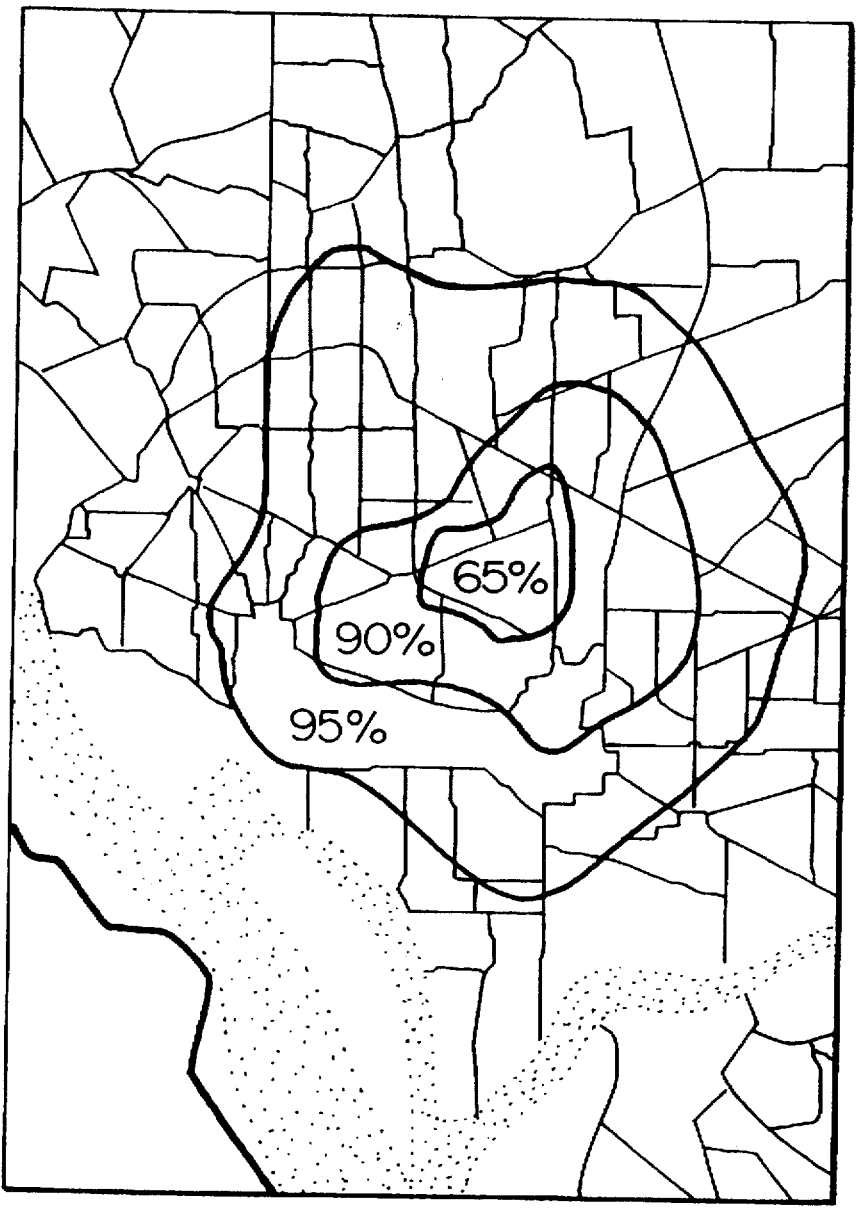
FIG. 3 geophraphically illustrates a choropleth map generated by the process of FIG. 1 for a hypothetical case in the District of Columbia.

When the probabilities are calculated for every point on the map, the end result is a three-dimensional probability surface that can be represented by an isopleth map. FIG. 2 shows an example of such a surface derived from the crime locations of a serial rapist in San Diego, Calif. An isopleth graph shows the value of one variable (in this instance, probability scores) as a function of two other variables (in this instance, north-south and east-west distances). Continuous lines mark out areas of equal probability much as contour lines mark out areas of equal altitude on a relief map. Alternatively, if viewed from above, the probability surface can be depicted by a two-dimensional choropleth map as shown in FIG. 3. In this case, the result can be overlaid on a city map of the involved area, and specific streets or blocks prioritized according to the associated values shown on the choropleth probability map.

The present invention works on the assumption that a relationship, modeled on some form of distance-decay function, exists between crime location and offender residence. The process can be thought of as a mathematical method for assigning a series of scores to the various points on a map that represents the serial offender's hunting area. Since the model cannot locate the residence of a criminal that lies outside of the boundaries of the hunting area map, it is necessary to limit the process to non-commuting offenders.

For the present invention locates a center of criminal activity, the score assigned to the point containing the offender's residence should be higher than the scores for most of the other points on the hunting area map. How well this requirement is met can be examined with a distribution curve that indicates the number of points with various scores. The "success" of the present invention in a given case can then be measured by determining the ratio of the total number of points with equal or higher scores to the total number of points in the hunting area. In other words, in what percentage of the total area would the offender's residence be found by a process that started in the locations with the highest scores and then worked down? The smaller that percentage (referred to as the "hit percentage"), the more successful the model.

While the geographic pattern for a crime series may yield several forms of information (coordinates, crime location type, area characteristics, nearest neighbor distances, point pattern, clustering, temporal ordering, etc.), the randomness inherent in most human behavior limits the conclusions that can be derived from a small number of crime sites. The use of more locations reduces the impact of chance. The performance of the present invention is thus related to the number of points available for analysis the more crime locations, the more information and, therefore, the more precision.

The determination of exactly which crime locations in a given case are relevant to the analysis, however, is a subjective process dependent upon the knowledge, experience and interpretation of the profiler.

The use of CGT in actual police investigations, and tests of the model on solved cases of serial murder, rape, and arson, have produced promising results, usually locating the offenders residence in a small percentage of the total hunting area. The offenders hunting area is a rectangular zone containing all the crime locations, usually oriented along north-south and east-west lines (the exact specification is defined below.) These crime locations may be victim encounter points, murder scenes, body dump sites, or some combination thereof. The term hunting area is therefore used broadly in the sense of the geographic region within which the offender chose—after, presumably, some form of search or hunting process—a series of locations in which to engage in one of the above offence-related actions. There may be other crime locations not known to the authorities and therefore would not be included in the analysis. And this approach does not contain those locations in which the offender searched for victims or dump sites, but was unsuccessful or chose not to act.

Further details of the embodiment of the present invention is now provided.

For process step one, map boundaries delineating the offenders hunting area are first calculated from the crime locations. Assuming a Manhattan grid oriented along north-south and east-west axes, the borders are determined by adding to the northernmost point ½ of the average y inter-point distance, subtracting from the southernmost point ½ of the average y inter-point distance, adding to the westernmost point ½ of the average x inter-point distance, and subtracting from the easternmost point ½ of the average x inter-point distance:

$$yhigh = ymax + (ymax - ymin)/2(T-1) \quad (1)$$

$$ylow = ymin - (ymax - ymin)/2(T-1) \quad (2)$$

$$xhigh = xmax + (xmax - xmin)/2(T-1) \quad (3)$$

$$xlow = xmin - (xmax - xmin)/2(T-1) \quad (4)$$

where:

yhigh is the y value of the northernmost boundary;
ylow is the y value of the southernmost boundary;
ymax is the maximum y value for any crime site;
ymin is the minimum y value for any crime site;
xhigh is the x value of the easternmost boundary;
xlow is the x value of the westernmost boundary;
xmax is the maximum x value for any crime site;
xmin is the minimum x value for any crime site; and
T is the total number of crime sites.

For step two, for every point on the map, the Manhattan distances to each crime location are then determined. An embodiment of the present invention uses about 10,000 points based on the measurement resolution of the x and y scales.

For step three, these Manhattan distances are used as independent variable values in a function which produces a number that: (a) if the point lies outside the buffer zone, becomes smaller the longer the distance, following some form of distance-decay; or (b) if the point lies inside the buffer zone, becomes larger the longer the distance.

Numbers are computed from this function for each of the crime locations. For example, if there are 12 crime locations, each point on the map will have 12 numbers associated with it.

Step four, these various numbers are combined together to produce a single score for each map point. The higher the resultant score, the greater the probability that the point contains center of criminal activity, for example the offenders home or workplace. The combining can be addition or multiplication.

An example of a probability function used in step 3 is:
1. The function is of the form:

$$P_{ij} = \sum_{c=1}^{T} k[\phi/(|x_i - x_c| + |y_j - y_c|)^f +$$

$$(1-\phi)(B^{g-f})/(2B - |x_i - x_c| - |y_j - y_c|)^g]$$

where:

$$|x_i - x_c| + |y_j - y_c| > B \supset \phi = 1$$

$$|x_i - x_c| + |y_j - y_c| \leq B \supset \phi = 0$$

and:

Pij is the resultant probability for point ij;

k is an empirically determined constant;

B is the radius of the buffer zone;

T is the total number of crime sites;

f is an empirically determined exponent;

g is an empirically determined exponent;

$x_i$, $y_j$ are the coordinates of grid point; and $x_c$, $y_c$ are the coordinates of the cth crime site location.

A three-dimensional surface is produced when the probability for every point on the map is calculated. This surface can be represented by an isopleth or fishnet map with different scores on the z-axis representing probability density (See FIG. 2). Such maps, a form of virtual reality (in the terms original sense), may be generated through computer-aided mathematical visualization.

Alternatively, the probability surface can be viewed from a top-down perspective and depicted through a two-dimensional choropleth map (See FIG. 3). If this is then overlaid on a city map of the targeted region, specific streets or blocks can be prioritized according to the associated values shown on the choropleth probability map. The resulting map is called a geoprofile.

The score function in Equation 5 assigns probability values based on the distances between map points and crime locations.

A geoprofile less dictates where an offender lives than it describes a search process. A search that starts in the highest (i.e., most probable) area and works down will be more likely to find the offender sooner than a random process would. Search efficiency is therefore an indicator of the performance of the present invention, and it can be measured by determining the proportion of the total hunting area covered before the offenders residence was encountered. This ratio is referred to as the hit percentage, and the actual size of the region it represents is called the search area.

Figure 4:
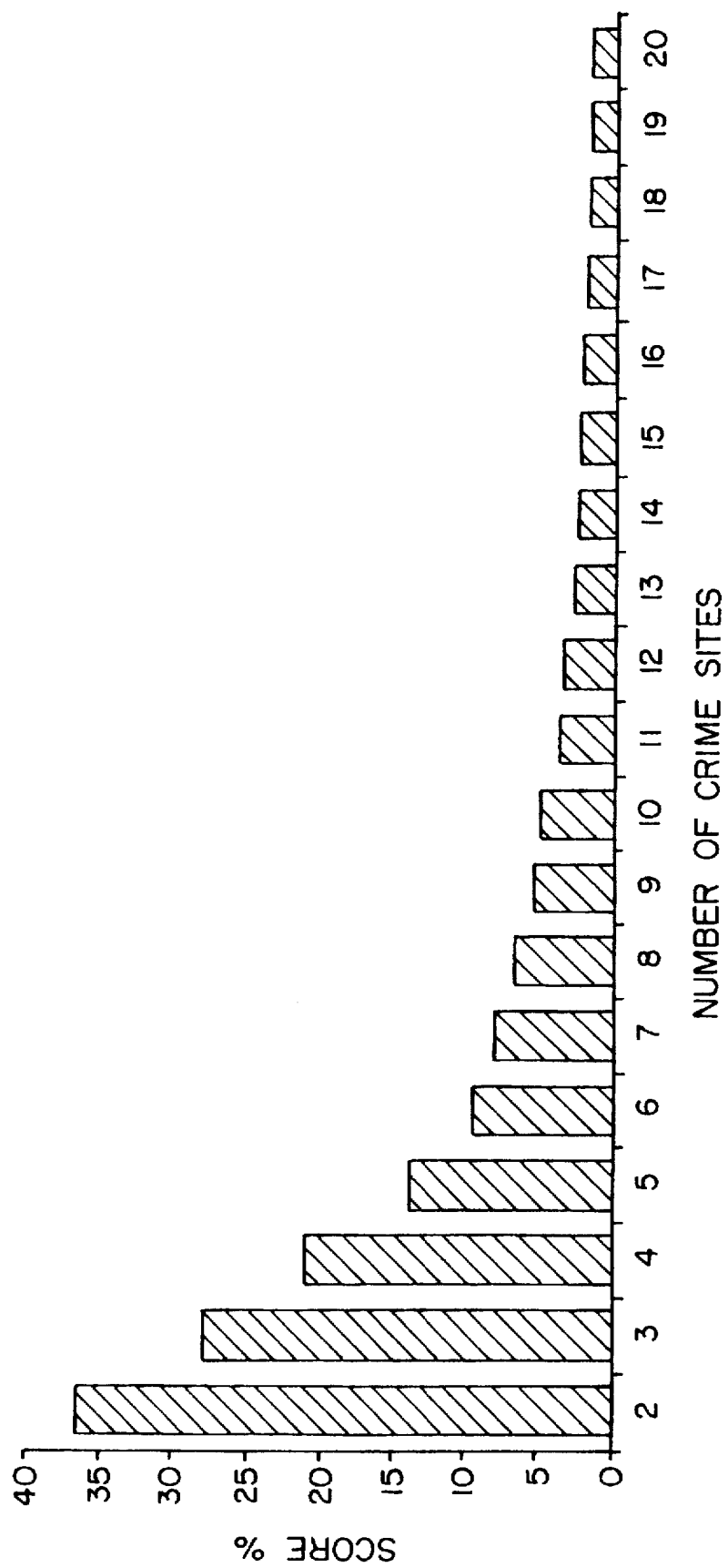
FIG. 4 graphically illustrates the relationship between the number of crime sites and ability of the process of FIG. 1 to located criminal activity center.

Monte Carlo testing (a heuristic method that uses repeated simulations), accomplished through a computer program that creates random crime site coordinates based on a buffered distance decay function, was conducted to estimate the theoretical maximum efficiency of the present invention. The testing produced the "learning curve" shown in FIG. 4, illustrates the relationship between the number of crime sites available for analysis and the hit percentage produced by the present invention. This process establishes that at least six crime locations are necessary to produce hit percentages under 10%.

The parameters of the probability function in Equation 5 determine the behaviour of the exemplary embodiment of the present invention and their proper specification can optimize its predictive ability. The parameters used in the present embodiment were developed from exploratory analysis conducted with cases of serial rape and serial arson. To avoid the problem of equivalency between testing and learning data sets, the microlevel data were not used to optimize the performance of the present embodiment.

The value of the distance exponent (f=1.2) was selected from a gravity model formulation developed to describe interprovincial migration patterns of criminal fugitives. This same exponent was used for distances both within and outside the buffer zone radius, that is g=f.

As the probability function only produces relative, as opposed to absolute scores, the main purpose served by the constant (k) is the prevention of program variable overflow (variable values must remain within the precision range of the specified integer and floating-point numeric variable types used in the software). To best accomplish this task the value of the constant was allowed to change, its specification varying with the other parameters and the total size of the hunting area.

The radius of the buffer zone (B) was initially set at 0.3 miles (approximately 0.5 kilometres). While this was a reasonable estimate for certain cases, it became apparent that the value was inappropriate for those offenders who operated over large metropolitan or regional areas. In such cases the buffer zone effectively disappeared. It was therefore necessary to define a variable radius, one flexible enough to accommodate different ranges of criminal mobility. An approach to such a definition was suggested by the crime site point pattern itself; it appeared that an indication of buffer zone size could be provided by the distances between points.

Consequently, the radius was set to equal the mean of the nearest neighbor distance (calculated using a Manhattan metric). This value was later modified slightly to address the spatial behavior of certain offenders who commit crimes both close to and far from their homes. The final buffer zone radius was established at one-half the mean nearest neighbor distance.

The performance of the embodiment of the present invention might be further improved through a systematic optimization analysis. In particular, the manner in which the buffered distance-decay function is specified appears to be important. Analysis on certain serial rape cases suggests that the buffer zone could be better described as an annulus, rather than a radius, a depiction that would in effect smooth out the transition between the two distance states. One method of accomplishing such an effect is through the use of a third or fourth-order polynomial function.

A particular embodiment of the present invention has been developed as an expert system including a computer workstation, a software program having database interfaces and crime site analysis modules. The computer workstation is for example a UltraSPARC by Sun Microsystems Inc.

Figure 5A:
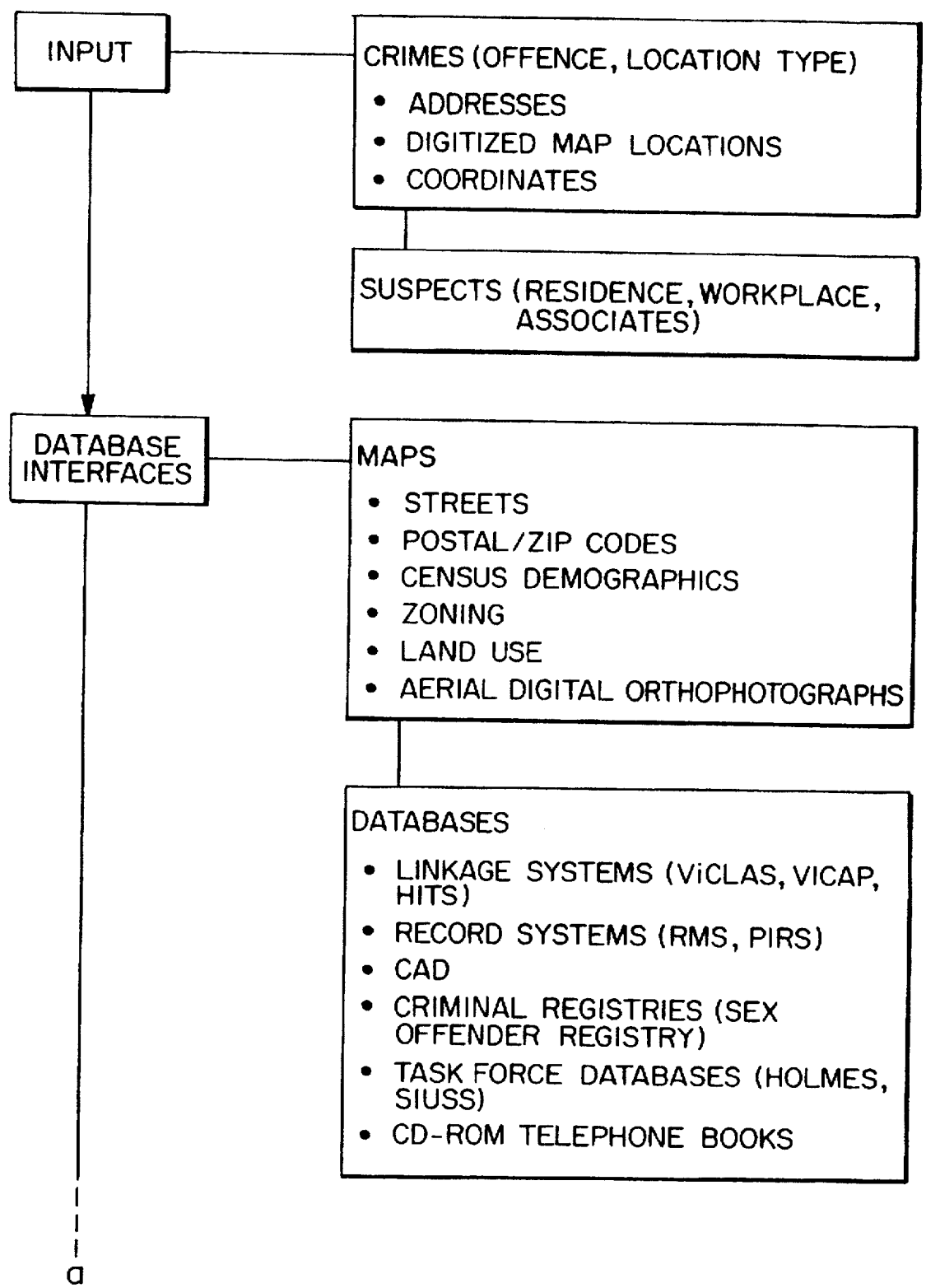
FIG. 5 and 5b illustrate in a flow chart an expert system method in accordance with a particular embodiment of the present invention.
Figure 5B:
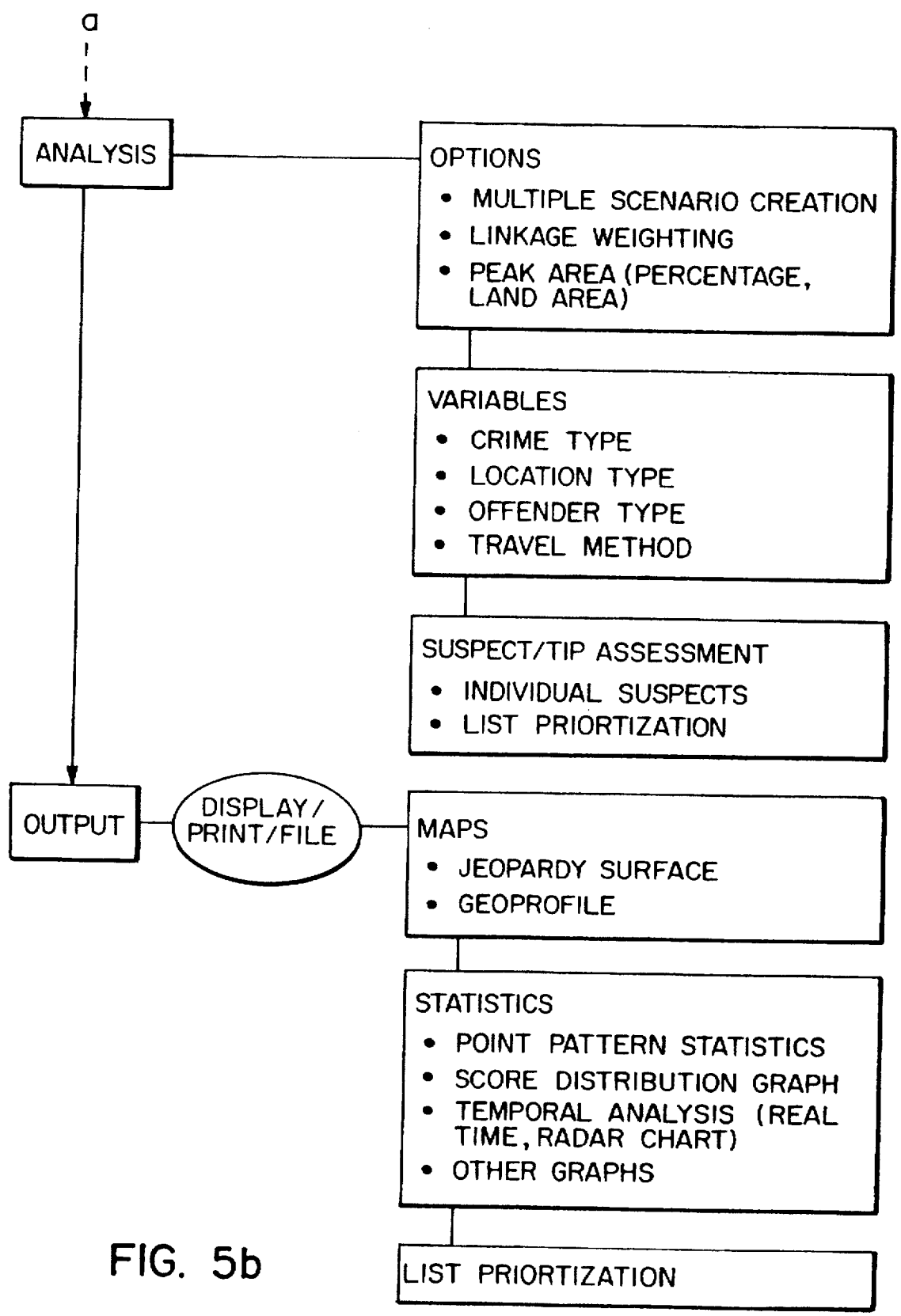

The computerized process is illustrated in FIG. 5. The computerized process is referred to as criminal geographic targeting CGT.

Step 1: Linkage Analysis

Precursor step performed to determine that the events to be analyzed are linked and meet the pre-requisites for CGT (e.g., in the case of serial crimes, that the crimes were performed by the same person(s)

Step 2: Hunting Typology

Precursor step performed to determine that the person(s) live or work in the hunting area Step 3: Assessment Step 4: Create Case Initial step to create a new case file, enter background information, and specify options.

The Expert System can step an inexperienced user through the process of creating a new case and selecting appropriate options. The Expert System can also filter input data to ensure that it meets the pre-requisites.

Step 5: Input Case Data

Majority of work consists of entering event locations and related event data. May take minutes or hours, depending on the quantity of data to be entered and the source. The data may be extracted from an existing database.

Individual cases may be weighted by probability of linkage.

Depending on previous work in the same area, it may also be necessary to retrieve or digitize a geographic map, and to perform an address-location translation. Map generation and address translation may be handled by a separate Geographic Information System.

The Expert System can step an inexperienced user through the process of entering or retrieving the input data from common sources.

Step 6: Perform Analysis

Performs a locus analysis, generating results in the form of a probability map. Time required depends on the number of events, the size of the geographic area covered, and the geographic resolution required, but should normally require minutes.

The Expert System will track the progress of the analysis, report any problems or deficiencies in the data, and suggest resolutions to the user.

Step 7: Evaluate Results

Displays results and confidence measurements in a form which can be easily evaluated by the user. Desired target confidence levels can be user selectable.

At this point, the user may choose to exclude some data or change some options, and re run the analysis.

The Expert System can assist in this process, giving qualitative and quantitative assessments of the results and recommending courses of action.

Step 8: Produce Report

Prints an analysis report, optionally showing:
case information
input data (list and/or map), including:
  address; date/time
  basic crime detail
  options selected
intermediate check results
evaluation of each input test locus
highest-probability target areas ranked in order of probability
Expert System recommendations A 3-D location probability graph of the target area can be produced if appropriate output equipment exists (e.g. laser printer or colour printer), normally an isoline map for black and white printers, or a probability density map for colour or gray scale printers.

The Expert System can advise inexperienced users on the appropriate output options and presentation formats for the particular data set and purpose.

Input to CGT, consisting of geographic crime site locations and related text information, may be entered manually, or transferred from a database system. It may be the output of a linkage analysis system like ViCLAS, or it may be the result of ad-hoc analysis by crime analysts or detectives.

Geographic coordinates may be in either of the following forms:

Map coordinates in any common-reference planar coordinate system (e.g. lat/long, UTM, X/Y distances from an arbitrary reference point, grid numbers)

Street address

Coordinates may be entered manually, or digitized directly from a map. The desired result is the most probable location(s) of the criminal's home or work site. CGT can present the results of the analysis in the form of a 3-D result value map, an ordered list of highest/lowest-value (or most-probable) locations, or the specific result values for a list of test locations.

A good result would be to narrow the target area to less than 5% of the total crime area with 90% probability, or to determine that a given site is within the 90% probability area.

The resulting most-probable-area polygon may be used as a geographic retrieval filter on a police database such as PIRS (RCMP Police Information Retrieval System), CAD (Computer Aided Dispatch System), or RMS (Record Management System). A combination of location (with address coordinate conversion if required) and other criteria such as crime type, date/time etc. may be used to extract relevant entries and rank them by probability.

Once a geographic profile has been constructed, a variety of criminal investigative strategies can be employed in a more effective and efficient manner. While the specific approaches are best determined by the police investigators familiar with the case in question, some examples of tactics used or suggested in the past are presented below. The development of further spatially based applications are innovative investigative techniques is an interactive process which involves the police officers responsible for the case in question.

Suspect Prioritization

If a lengthy list of suspects has been developed, the geographic profile in conjunction with the criminal offender profile can help prioritize individuals for follow-up investigative work. The problem in many serial violent crime investigations is one of too many suspects rather than too few. Profiling can help prioritize lists of sometimes hundreds if not thousands of suspects, leads and tips.

Patrol Saturation

Areas that have been determined to most probably be associated with the offender can be used as a basis for directed or saturation police patrolling efforts. This strategy is particularly effective if the offender appears to be operating during certain time periods. Prioritized areas can also be employed for neighbourhood canvassing efforts, area searches, information sign posting, and community cooperation and media campaigns. Police departments have used this approach to target areas for leaflet distribution, employing prioritized letter carrier walks for strategic household mail delivery. For example, LeBeau (1992) mentions the case of a serial rapist in San Diego who was arrested through canvassing efforts in an area determined from the locations of his crimes.

Police Information System

Additional investigative leads may be obtained from the information contained in various computerized police dispatch and record systems (e.g., computer-aided dispatch systems, records management systems, the Royal Canadian Mounted Police Information Retrieval System, and the like). Offender profile details and case specifics can help focus the search at this point.

For example, the police may be investigating a series of sexual assaults that have been psychologically profiled as the crimes of an anger retaliatory rapist. Such an offender is "getting even with women for real or imagined wrongs . . . the attack is an emotional outburst that is predicated on anger" (Hazelwood, 1987: 178–179). His rapes are often initiated by conflicts with a significant woman in his life, and he will frequently select victims who symbolize the source of that conflict. One possible investigative strategy, then, is a search of police dispatch data for domestic disturbance calls near the dates of the rapes to see which ones originated from the area where the geographic profile suggests that the offender most likely resides.

Those police agencies that maintain computerized records detailing the descriptions, addresses and modus operandi of local offenders can also use profiling information, including probable area of residence, as the basis for developing search criteria. Many departments have such files for specific types of criminals, such as parolees or sex offenders.

Outside Agency Databases

Data banks, which are often geographically based, as well as information from parole and probation offices, mental health outpatient clinics, social services offices and similar agencies located in the most probable areas can also prove to be of value. For example, LeBeau (1992) discusses the case of a serial rapist who emerged as a suspect after the police checked parolee records for sex offenders.

Zip/Postal Code Prioritization

The geographic profile can also prioritize zip or postal codes in a city. If suspect offender description or vehicle information exists, prioritized zip or postal codes (representing the most probable 1 or 2% of a city's area) can be used to conduct effective off-line computer searches of registered vehicle or driver's licence files contained in provincial or state motor vehicle department records. These parameters act as a form of linear program to produce a surprisingly small set of records containing fields with all the appropriate data responses. Such a strategy can therefore produce significant results by focusing on limited areas that are of a manageable size for most serious criminal police investigations.

The following is one example of the use of this approach. The postal codes for a city neighborhood within which a violent sexual offender was attacking children were prioritized by using the criminal geographic targeting model. Planning and zoning maps were used to eliminate industrial, commercial and other non-residential areas. Socioeconomic and demographic census data were also consulted to reevaluate the priority of those neighborhoods that were inconsistent with the socioeconomic level of the offender, as suggested by a previously prepared psychological profile.

The remaining postal codes, ranked by priority of probability, were then used to conduct an off-line computer search of the provincial motor vehicle department records that contain postal codes within the addresses connected to the vehicle registered owner and driver's licence files. Suspect vehicle information and an offender description had been developed by the detectives working on the case, and this was combined with the geographic data to effectively focus the off-line search. The conjunction of such parameters can narrow down hundreds of thousands or records to a few dozen vehicles or drivers—sufficient discrimination to allow a focused follow-up by police investigators.

Task Force Computer Systems

Task force operations that have been formed to investigate a specific series of major crimes usually collect and collate their information in some form of computerized system. Often these operations suffer from information overload and can benefit from the prioritization of data and the application of correlation analyses. Geographic profiling can assist in these tasks through the prioritization of street addresses postal or zip codes, and telephone number areas. The details of the specific computer database software used by the task force, including information fields, search time, number of records, and correlational abilities, determine the most appropriate form that the geographic profile should take to maximize its usefulness to the police investigation.

Geographic profiling infers spatial characteristics of the offender from target patterns. This method uses qualitative and quantitative approaches that attempt to make sense of the pattern from both subjective and objective perspectives. Criminal geographic targeting is a specific statistical method that enhances the efforts of geographic profiling by delineating the most probable areas to which the offender might be associated.

Since geographic profiling is based on an analyses of crime-site locations, a linkage analyses is a necessary prerequisite to determine which crimes are part of the same series and should be included in the development of the profile. It must also be noted that not all types of offenders or categories of crime can be geographically profiled. In appropriate cases, however, such a spatial analysis can produce very practical results from the police perspective. There are a variety of ways which geographic information about the offender can assist the investigation, including the prioritization of suspects by address or area, the direction of patrol saturation efforts and the establishment of computerized database search parameters.

Geographic profiling therefore appears to have significant investigative value in certain types or criminal cases. It is also an example of the application of criminological theory to a criminal justice problem. Through a process of "inverting" criminological and geographic research that has focused on relating crime places to offender residences, the locations of a series of crimes can be used to suggest where an offender might reside.

Environmental criminology, because of its rich context and diverse roots has been particular fruitful in the development of practical applications and holds the promise of many future ideas for crime prevention and policing.

While the present embodiment uses Manhattan or orthogonal distances, any distance related measurement can be used. For example, shortest point-to-point, wheel or travel time-based would all work.

Numerous modifications, adaptations and variations can be made to the above described embodiments of the invention without departing from the scope of the invention as defined in the claims.

APPENDIX A

Kennedy, D. (1993). *Closing the Drug Market*. (Research in Brief series.) Washington, D.C.: U.S. National Institute of Justice.

Lurigio, A. J., R. C. David, T. A. Regulus, V. E. Gwiasda, S. J. Popkin, M. L. Dantzker, B. Smith and L. Ouellet, (1993). *An Implementation Evaluation of the Cook County State's Attorney's Office Narcotics Nuisance Abatement Unit*. Chicago, Ill.: Illinois Criminal Justice Information Authority.

Lyman, M. D. (1987). *Narcotics and Crime Control*. Springfield, Ill.: Charles C Thomas.

Mann, K. (1992). "Procedure Rules and Information Control: Gaining Leverage Over White Collar Crime". In: K. Schlegel and D. Weisburd (eds.), *White Collar Crime Reconsidered*. Boston, Mass.: Northeastern University Press.

Manning, P. K. (1980). *The Narc's Game: Organizational and Informational Limits on Drug Law Enforcement*. Cambridge, Mass.: MIT Press.

Roncek, D. and P. Maier. (1991). "Bars, Blocks and Crimes Revisited: Linking the Theory of Routine Activities to the Empiricism of 'Hotspots'." *Criminology* 29:725–754.

Snyder, R. (1990). "Oakland Church Community Organizations' Community Response to Drug Abuse." In: U.S. Conference of Mayors (ed.), *Eight Successful City Drug Control Programs*, Washington, D.C.

Uchida, C. D., B. Forst and S. Annan. (1992). *Modern Policing and the Control of Illegal Drugs: Testing New Strategies in Two American Cities*. Washington D.C.: U.S. Department of Justice.

U.S. National Institute of Justice. (1992). *Community Policing in Seattle: A Model Partnership Between Citizens and Police*. (Research in Brief series.) Washington, D.C.: Author.

Ward, B. (1987). "Drug Abuse and Trafficking: NYPCD Meets the Challenge." *Police Chief* 54:81–85.

Weisburd, D. and L. Green. (1994). "Defining the Drug Market: The Case of Jersey City's DMAP System." In: D. MacKenzie and C. Uchida (eds.), *Drugs and Crime: Evaluating Public Policy Initiatives*. Newbury Park, Calif.: Sage.

——— (1995). "Policing Drug Hotspots: Findings from the Jersey City DMA." *Justice Quarterly* (forthcoming).

Brantingham, P. J. and P. L. Brantingham (eds.) (1981). *Environmental Criminology*. Beverly Hills. Calif.: Sage.

——— (1984). *Patterns in Crime*. New York: Macmillan.

Clarke, R. V. (ed.) (1992). *Situational Crime Prevention: Successful Case Studies*. Albany. N.Y.: Harrow and Heston.

——— and M. Felson (eds.) (1993). *Routine Activity and Rational Choice*. New Brunswick, N.J.: Transaction Books.

Cornish, D. B. and R. V. Clarke (eds.) (1986). *The Reasoning Criminal: Rational Choice Perspectives on Offending*. New York, N.Y.: Springer-Verlag.

Doney, R. H. (1990). "The Aftermath of the Yorkshire Ripper: The Response of the United Kingdom Police Service". In: S. A. Egger (ed.), *Serial Murder: An Elusive Phenomenon*. New York, N.Y.: Praeger.

Eden, R. S. (1985). *Dog Training for Law Enforcement*. Calgary. CAN: Detselig.

Felson, M. (1986). "Linking Criminal Choices, Routine Activities, Informal Control, and Criminal Outcomes." In: D. B. Cornish and R. V. Clarke (eds.) *The Reasoning Criminal: Rational Choice Perspectives on Offending*. New York. N.Y.: Springer-Verlag.

——— (1987). "Routine Activities and Crime Prevention in the Developing Metropolis." *Criminology* 25:911–931.

Gates, D. F. and D K. Shah (1992). *Chief*. New York N.Y.: Bantam Books.

Harries, K. (1990). *Geographic Factors in Policing*. Washington D.C.: Police Executive Research Forum.

Hazelwood, R. R. (1987). "Analyzing the Rape and Profiling the Offender." In R. R. Hazelwood & A. W. Burgess (eds.) *Practical Aspects of Rape Investigation: A Multidisciplinary Approach*. New York. N.Y.: Elsevier.

Holt, C. (1993). Personal communication to the author from a former member of the Los Angeles. Calif. Police Department.

Jeffery, C. R. (1977). *Crime Prevention Through Environmental Design*. 2d ed. Beverly Hills. Calif.: Sage.

Kind, S. S. (1987a). "Navigational Ideas and the Yorkshire Ripper Investigation." *Journal of Navigation* 40:385–393.

Klockars, C. B. (ed.) (1983). *Thinking about Police: Contemporary Readings*. New York. N.Y.: McGraw-Hill.

LeBeau, J. L. (1992). "Four Case Studies Illustrating the Spatial-Temporal Analysis of Serial Rapists." *Police Studies* 15:124–145.

Montgomery, J. E. (1992). "Organizational Survival: Continuity or Crisis?" Paper presented at the Police Studies Series, Simon Fraser University. Vancouver BC. February.

Newton, Jr. M. B. and D. C. Newton (1985). "Geoforensic Identification of Localized Serial Crime: Unsolved Female Homicides. Fort Worth. Tex. 1983–85." Paper presented at the meeting of the Southwest Division, Association of American Geographers, Denton. Tex.

——— and E. A. Swoope (1987). "Geoforensic Analysis of Localized Serial Murder: The Hillside Stranglers Located." Unpublished manuscript.

Rengert, G. F. (1990). "Drug Purchasing as a Routine Activity of Drug Dependent Property Criminals and the Spatial Concentration of Crime." Paper presented at the annual meeting of the American Society of Criminology, Baltimore. Md.

——— (1991). "The Spatial Clustering of Residential Burglaries About Anchor Points of Routine Activities." Paper presented at the meeting of the American Society of Criminology, San Francisco, Calif.

Rhodes, W. M. and C. Conly (1981). "Crime and Mobility: An Empirical Study." In: P. J. Brantingham and P. L. Brantingham (eds.). *Environmental Criminology*. Beverly Hills, Calif.: Sage.

Rossmo, D. K. (1987). "Fugitive Migration Patterns." Master's thesis, Simon Fraser University, Burnaby, BC, Canada.

——— (1993). "Target Patterns of Serial Murderers: A Methodological Model." *American Journal of Criminal Justice* 17:1–21.

——— (1995). "Targeting Victims: Serial Killers and the Urban Environment". In: T. O'Reilly-Fleming (ed.), *Serial and Mass Murder: Theory, Research and Policy*. Toronto. CAN: Canadian Scholar's Press.

Vold, G. B. and T. J. Bernard (1986). *Theoretical Criminology*. New York, N.Y., Oxford University Press.

Wood, D. (1981). "In Defense of Indefensible Space". In: P. J. Brantingham and P. L. Brantingham (eds.) *Environmental Criminology*, Beverly Hills, Calif.: Sage.

What is claimed is:

1. An expert system method of analyzing crime site data for determining a base of criminal activity, comprising the steps of:

locating a plurality of related crime sites on an area map;

converting said plurality of related crime scene location data into signals representing discrete crime sites;

delineating a criminal activity area on the area map in dependence upon spacing between the plurality of crime sites;

establishing an x-y grid having a plurality of grid points within the criminal activity area;

for each grid point, determining a distance to each of the plurality of related crime sites;

for each grid point, determining a first probability value in dependence upon each distance, then combining first probability values to determine a second probability value; and outputting a signal representing a center of criminal activity in dependence upon second probability values for the criminal activity area.

2. An expert system method as claimed in claim 1 wherein the step of generating first probability values uses a distance decay function.

3. An expert system method as claimed in claim 2 wherein the distance decay function is augmented by a buffer zone.

4. An expert system method as claimed in claim 3 wherein the step of step of generating probability values uses the following function:

$$P_{ij} = \sum_{c=1}^{T} k[\phi(|x_i - x_c|, |y_j - y_c|)^f + (1-\phi)(B^g - f)/(2B - |x_i - x_c| - |y_j - y_c|)^g]$$

where:

$|x_i - x_c| + |y_j - y_c| > B \supset \phi = 1$ $|x_i - x_c| + |y_j - y_c| \leq B \supset \phi = 0$ and:

Pij is the resultant probability for point ij;

k is an empirically determined constant;

B is the radius of the buffer zone;

T is the total number of crime sites;

f is an empirically determined exponent;

g is an empirically determined exponent;

$x_i$, $y_j$ are the coordinates of grid point; and $x_c$, $y_c$ are the coordinates of the cth crime site location.

5. An expert system method as claimed in claim 1 wherein the step of combining first probability values includes the step of summing first probability values together.

6. An expert system method as claimed in claim 1 wherein the step of combining first probability values includes the step of multiplying first probability values together.

7. An expert system method as claimed in claim 1 wherein the step of outputting includes the steps of generating a coded display of second probability values, overlaying the coded display on the crime activity area and correlating an area having second probability values above a predetermined threshold with a physical location to establish an area defining the center of criminal activity.

8. An expert system method as claimed in claim 7 wherein the step of outputting includes the steps of importing case data and correlating the case data with the center of criminal activity to reduce the area associated therewith.

9. An expert system method as claimed in claim 1 wherein the case data includes suspect addresses.

10. An expert system for analyzing crime site data for determining a base of criminal activity, comprising a computer having a memory for storing intermediate values, a display and a printer and a central processing unit controlled software to provide means for locating a plurality of related crime sites on an area map presented on the display;

means for converting a plurality of related crime scene location data into signals representing discrete crime sites;

means for delineating a criminal activity area on the area map in dependence upon spacing between the plurality of crime sites;

means for establishing an x-y grid having a plurality of grid points within the criminal activity area;

for each grid point, means for determining a distance to each of the plurality of related crime sites and means for determining a first probability value in dependence upon each distance and means for combining first probability values to determine a second probability value; and means for outputting, to the display and printer, a signal representing a center of criminal activity in dependence upon second probability values for the criminal activity area.

* * * * *

UNITED STATES PATENT AND TRADEMARK OFFICE
CERTIFICATE OF CORRECTION

PATENT NO. : 5,781,704
DATED      : July 14, 1998
INVENTOR(S): Darcy Kim Rossmo

Page 1 of 2

It is certified that error appears in the above-identified patent and that said Letters Patent is hereby corrected as shown below:

Claim 4, Col. 16, line 66, please delete "step of" (second occurrence).

Claim 4, Col. 17, line 3, "$P_{ij} = k[\phi/(|x_i - x_c| y_j - y_c|)^f +$" should be --$P_{ij} = \Pi k[\phi/(|x_i - x_c| y_j - y_c|)^f +$--.

Col. 5, lines 36-37, delete "n expert system method of".

Col. 5, line 39, delete "in".

Col. 8, line 25, change "westernmost" to --easternmost--.

Col. 9, line 2, delete "1.".

Col. 9, lines 4-8, should read -- $P_{ij} = k\sum_{c=1}^{T}[\phi/(|x_i-x_c| + |y_j-y_c|)^f + (1-\phi)(B^{g-f})/(2B-|x_i-x_c|-|y_j-y_c|)^g]$ Col. 9, line 19, change "Pij" to --$P_{ij}$--, and after "ij;" insert --$\phi$ is a weighting factor--.

Col. 9, line 26, change "grid point" to --point ij--.

UNITED STATES PATENT AND TRADEMARK OFFICE
CERTIFICATE OF CORRECTION

PATENT NO. : 5,781,704
DATED : July 14, 1998
INVENTOR(S) : Darcy Kim Rossmo

It is certified that error appears in the above-identified patent and that said Letters Patent is hereby corrected as shown below:

Col. 17, lines 2-6, should read -- $P_{ij} = k \sum_{c=1}^{T} [\phi/(|x_i-x_c| + |y_j-y_c|)^f + (1-\phi)(B^{g-f})/(2B-|x_i-x_c|-|y_j-y_c|)^g]$ --

Col. 17, line 14, change "Pij" to --$P_{ij}$--, and after "ij;" insert --$\phi$ is a weighting factor--.

Col. 17, line 19, change "grid point" to --point ij--.

Signed and Sealed this

Sixteenth Day of March, 1999

Attest:

Q. TODD DICKINSON

*Attesting Officer*        *Acting Commissioner of Patents and Trademarks*

(12) REEXAMINATION CERTIFICATE (4614th)
United States Patent
Rossmo

(10) Number: US 5,781,704 C1
(45) Certificate Issued: Jul. 16, 2002

(54) EXPERT SYSTEM METHOD OF PERFORMING CRIME SITE ANALYSIS

(75) Inventor: Darcy Kim Rossmo, Vancouver (CA)

(73) Assignee: Environmental Criminology Research Inc., West Vancouver (CA)

Reexamination Request:
No. 90/006,023, May 29, 2001

Reexamination Certificate for:
Patent No.: 5,781,704
Issued: Jul. 14, 1998
Appl. No.: 08/730,465
Filed: Oct. 11, 1996

Certificate of Correction issued Mar. 16, 1999.

(51) Int. Cl.[7] .............................................. G06F 17/00
(52) U.S. Cl. ......................................... 706/45; 706/50
(58) Field of Search ..................................... 706/45, 50

(56) References Cited

PUBLICATIONS

"Geographic Profiling: Locating Serial Killers" by D. Kim Rossmo presented at the "International Seminar on Environmental Criminology and Crime Analysis", Miami, FL on May 28, 1993.
"Multivariate Spatial Profiles as a Tool in Crime Investigation" by D. Kim Rossmo, presented at the seminar entitled "Workshop on Crime Analysis Through Computer Mapping", Chicago, IL on Aug. 23, 1993.
"Urban Transportation Modeling and Planning" by Peter R. Stopher and Armin H. Meyburg Lexington Books, Lexington, MA 1975.
"Forecasting Techniques for Urban and Regional Planning" by Brian G. Field and Bryan D. MacGregor UCL Press, London, England 1987, pp. 102–195.
"Notes on the Geometry of Crime" by Patricia L. Brantingham and Paul J. Brantingham Environmental Criminology, Beverly Hills, CA, (ed. 1981), pp. 27–54.
"Navigational Ideas and the Yorkshire Ripper Investigation" by Stuart S. Kind Journal of Navigation, vol. 40 (1987) pp. 385–393.
"Four Case Studies Illustrating the Spatial–Temporal Analysis of Serial Rapist" by James L. LeBeau Police Studies, vol. 15 (1992) pp. 124–145.
"Geoforensic Identification of Localized Serial Crime: Unsolved Female Homicides, Fort Worth, TX 1983–85" by M.B. Newton, Jr. and D.C. Newton Paper presented at the meeting of the Southwest Division, Association of American Geographers, Denton, TX on Oct. 18, 1985.
"Geoforensic Analysis of Localized Serial Murder: The Hillside Stranglers Located" by M.B. Newton, Jr. Ph.D. and Elizabeth A. Swoope, M.Agr. 1987—Unpublished manuscript.
"Identifying the Residential Location of Rapists" by DV Canter and A. Gregory Journal of the Forensic Science Society 1994, vol. 34, pp. 169–175.
"The Environmental Range of Serial Rapists" by David Canter and Paul Larkin Journal of Environmental Psychology (1993), vol. 13, 63–69.
"Serial Murder Investigations and Geographic Information Systems" by Robert Rogers, Delores Craig and David Anderson University of Tennessee at Chattanooga, 1991.

*Primary Examiner*—George B. Davis

(57) ABSTRACT

An expert system method is provided that performs crime site analysis in a criminal activity area to determine a likely center of criminal activity. The method uses distances from related crime sites to determine a probability surface for the entire criminal activity area. A target area having highest values of probability becomes the center of criminal activity. The expert system can be used to access other crime databases such as witness reports to further define the criminals; residence or workplace.

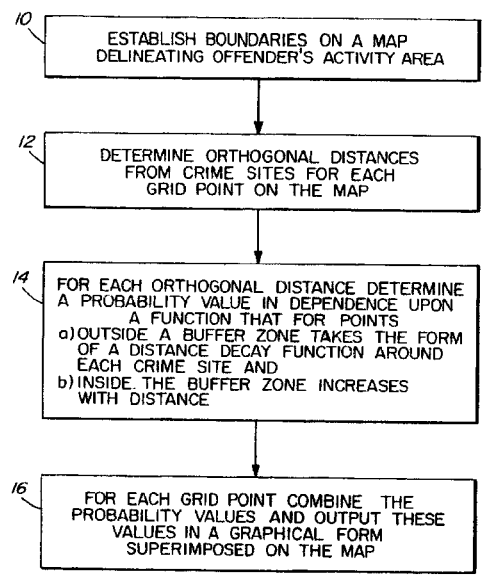

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 5–10 is confirmed.

Claims 2 and 4 are determined to be patentable as amended.

Claim 3, dependent on an amended claim, is determined to be patentable.

2. An expert system method as claimed in claim 1 wherein the step of [generating] *determining* first probability values uses a distance decay function.

4. An expert system method as claimed in claim 3 wherein the step of [generating] *determining first* probability values uses the following function:

$$P_{ij} = k \sum_{c=1}^{T} [\phi/(|x_i - x_c| + |y_j - y_c|)^f + (1-\phi)(B^{g-f})/(2B - |x_i - x_c| - |y_j - y_c|)^g]$$

where:

$$|x_i - x_c| + |y_j - y_c| > B \supset \oint = 1$$

$$|x_i - x_c| + |y_j - y_c| \leq B \supset \oint = 0$$

and:

$P_{ij}$ is [the] *a* resultant probability for point ij;

$\phi$ is a weighting factor;

k is an empirically determined constant;

B is [the] *a* radius of [the] *a* buffer zone;

T is [the] *a* total number of crime sites;

f is an empirically determined exponent;

g is an empirically determined exponent;

$x_i$, $y_j$ are [the] coordinates of point ij; and $x_c$, $y_c$ are [the] coordinates of [the] *a* $c^{th}$ crime site location.

* * * * *